(12) United States Patent
Kingston

(10) Patent No.: US 7,912,466 B2
(45) Date of Patent: Mar. 22, 2011

(54) CHANNEL ACQUISITION

(75) Inventor: Simon James Kingston, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 947 days.

(21) Appl. No.: 11/672,431

(22) Filed: Feb. 7, 2007

(65) Prior Publication Data

US 2007/0197218 A1 Aug. 23, 2007

(30) Foreign Application Priority Data

Feb. 10, 2006 (GB) .................................. 0602769.2

(51) Int. Cl.
*H04Q 7/20* (2006.01)
(52) U.S. Cl. ........................................ 455/434; 455/500
(58) Field of Classification Search .................. 455/434, 455/74, 78, 41.2, 41.3, 552.1, 574
See application file for complete search history.

(56) References Cited

U.S. PATENT DOCUMENTS

| | | | | |
|---|---|---|---|---|
| 6,574,266 | B1 * | 6/2003 | Haartsen | 375/133 |
| 6,801,777 | B2 * | 10/2004 | Rusch | 455/452.2 |
| 7,567,540 | B2 * | 7/2009 | Sakoda | 370/338 |
| 2005/0059345 | A1 * | 3/2005 | Palin et al. | 455/41.2 |
| 2005/0085261 | A1 * | 4/2005 | Sugaya | 455/552.1 |
| 2005/0255878 | A1 * | 11/2005 | Leinonen et al. | 455/552.1 |
| 2006/0030318 | A1 * | 2/2006 | Moore et al. | 455/434 |

* cited by examiner

*Primary Examiner* — Nghi H Ly
*Assistant Examiner* — Myron Wyche
(74) *Attorney, Agent, or Firm* — Novak Druce DeLuca + Quigg LLP

(57) ABSTRACT

A method for establishing a radio communication channel by means of a first air interface between a first device and a second device, the method comprising: transmitting from one of the devices to the other by means of a second air interface information that at least partially identifies the channel; and establishing the channel by means of that information.

26 Claims, 1 Drawing Sheet

CHANNEL ACQUISITION

BACKGROUND OF THE INVENTION

This invention relates to acquiring a communication channel in a communication system. The invention is especially but not exclusively applicable to ultra-wideband (UWB) radio systems.

A number of standard radio specifications are currently being proposed for UWB radio communications. One example is the MBOA (MultiBand ODFM Alliance) specification. These specifications effectively define a number of radio frequency (RF) channels: in one example, 35 RF channels. Each RF channel is defined by a combination of a frequency band and an RF hopping sequence. In order for two UWB devices to be able to communicate with each other, one must be configured to receive on the same channel as the other is transmitting.

When two UWB devices initially begin to establish a connection with each other they must arrange that they are operating on the same channel. This is achieved in the following way. One of the devices is presumed to be an "established device", which is operating on a predetermined channel. This may happen because it is already communicating with a third device, or has been doing so. Alternatively, it may happen because the channel acquisition algorithm dictates that a certain device should act either temporarily or permanently as an established device so as to facilitate channel acquisition. The other device (the "searching" device) then scans the channel spectrum until it detects transmissions from the established device.

At the outset the searching device has no knowledge of the channel on which the established device is transmitting. Therefore, the searching device must search each channel in turn until the established device is found. Assuming that the established device is operating on only a single channel and that it is transmitting a beacon on that channel once every 65.536 ms (which is the length of a superframe in at least one proposed system), it may take up to 2.29 seconds (35 channels times 65.536 ms per channel) before the searching device can find the established device.

The established device may support a power-saving mode in which, when it is not in active communication with another device it does not transmit every superframe. If the established device is in a power-saving mode, the searching device may take even longer to find the communication channel. If the established device were to hibernate for 255 superframes at a time it would transmit a beacon on its current channel once every 16.84 seconds. In this situation, to perform a full search of all 35 channels the searching device would have to listen on each channel for at least 16.84 seconds, and so a full search would take 589 seconds, or nearly 10 minutes.

It is possible that neither device could be acting as an established device: both devices could be searching simultaneously. In that case the result would be even worse because as both devices continuously change RF channels they could completely fail to coincide on a common channel. A similar problem may occur if both devices are established and each device is maintaining its current links whilst simultaneously searching for the other device.

There is therefore a need for improving the speed of channel acquisition in such systems.

SUMMARY OF THE INVENTION

According to one aspect of the present invention there is provided a method for establishing a radio communication channel by means of a first air interface between a first device and a second device, the method comprising: transmitting from one of the devices to the other by means of a second air interface information that at least partially identifies the channel; and establishing the channel by means of that information.

Preferably the first and second air interfaces differ in the communication protocols according to which they operate. Preferably the first air interface is an ultra-wideband air interface. Preferably the second air interface is a Bluetooth air interface.

Preferably the first and second air interfaces occupy different frequency bands.

The said information may wholly identify the channel. The said establishing step may comprise both devices adopting that channel for communication over the first air interface.

Alternatively the said information may partially identify the channel. The said establishing step may comprises: the first device transmitting one or more beacon transmission signals on the channel in accordance with the said information; the second device determining on the basis of the said information a procedure for attempting to receive a beacon transmission from the first device; the second device attempting to receive a beacon transmission from the first device in accordance with the determined procedure; and on the second device receiving a beacon transmission from the first device on a channel, the first device adopting that channel for communication over the first air interface.

The said procedure may be such as to inhibit attempts by the second device at reception of beacon transmissions that are not in accordance with the said information.

The said information may comprise information that indicates the timing of beacon transmissions. Such beacon transmissions are suitable beacon transmissions of the first air interface.

The said information may be in the form of the timing of communication slots of the first air interface, most conveniently in the form of the timing of such communications relative to the timing of the communication slots of the second air interface. The method may comprise transmitting beacon transmissions of the first air interface such that the timings of those beacon transmissions are offset in a predetermined manner from the timings of the slots or of one or more particular slots of the second air interface. That manner may be such that the difference in time between every slot or every n-th slot and a beacon transmission is of a preset value. That value could be zero.

The said information may comprise information that indicates the frequency, spreading code or frequency hopping sequence of beacon transmissions.

The first air interface may operate according to a system according to which a device searches a range of channels in order to identify a channel on which another devices is transmitting a beacon signal for establishing a communication channel with that device.

Preferably the second air interface is of a system in which devices may communicate on a plurality of channels but wherein devices are restricted to transmitting signals on a subset of those channels for establishing a communication channel with another device with which they are not in communication. For example, in the case of Bluetooth the Bluetooth paging procedure involves the use of a subset of the available Bluetooth channels for the transmission of signals whereby devices can page other devices. The set of channels to be used for paging a particular other device is limited to a single channel at any one time. Thus, the subset could consist of a single channel in each time slot. It could be a constant channel, for example a dedicated broadcast channel whereby any other device can listen for identification signals. The subset may be a function of the identity of the device that is intended to receive the signals. The signals could be paging signals.

The first air interface and the second air interface can conveniently be supported by respective sets of apparatus. The sets of apparatus may be respective transceivers. Preferably the device is configured to maintain at least part of the first set of apparatus in a low power state until a request to activate it is received via the second air interface. Preferably the device is configured to maintain at least part of the first set of apparatus in a low power state during the step of transmitting from one of the devices to the other by means of a second air interface information that at least partially identifies the channel. The low power state may be a state in which the relevant apparatus is powered off, or one in which it is partially powered down.

According to a second aspect of the present invention there is provided a radio communication device arranged to, for establishing a radio communication channel by means of a first air interface between the device and another device: receive from the other device by means of a second air interface information that at least partially identifies the channel; and establish the channel by means of that information.

BRIEF DESCRIPTION OF THE DRAWINGS

The present invention will now be described by way of example with reference to the accompanying drawings, in which.

DETAILED DESCRIPTION OF PREFERRED EMBODIMENTS

Figure 1:
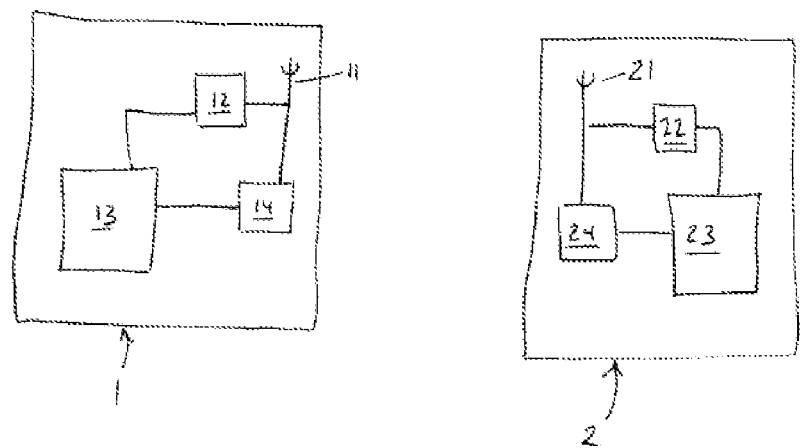
FIG. 1 shows components of a communication system in accordance with preferred embodiments of the present invention.

FIG. 1 shows two devices 1, 2 that are capable of communicating with each other using UWB signals. Each device comprises an antenna 11, 21 which is connected to a UWB transceiver 12, 22. The UWB transceiver is connected to a central processing section 13, 23. The core processing section performs the core functionality of the device. The UWB transceiver encodes data received from the core processing section and transmits it over the air via the antenna. It also decodes signals received by the antenna and passes the received data to the core processing section.

Each device also has a secondary transceiver 14, 24. The secondary transceivers operate on another band or protocol from the transceivers 12, 22. This is discussed in more detail below, but as an example the transceivers 12, 22 could be Bluetooth transceivers. The transceivers 12 and 14 in device 1 could be integrated into a single physical unit. The same goes for the transceivers of device 2.

The transceivers of each device are capable of communicating with each other. They may do this directly or via the respective central processing section.

The need for one of the devices ("device A") to establish a communication channel with the other ("device B") may be initiated from the central processing section of device A, either programmatically or after input from a user of the device. It may also be initiated from one of the transceivers of device A. Once the establishment of a communication channel has been initiated the transceivers 14 and 24 establish communication with each other (if they are not already in communication) and communicate so as to agree on a communication channel for use by transceivers 12, 22. One or both of the transceivers 14, 24 pass the specification of that channel to the respective one of the transceivers 12, 22 so that both transceivers 12, 22 have knowledge of that channel. Then the transceivers 12, 22 begin to communicate using UWB signals on that channel. By signalling the UWB channel using out-of-band means the time to establish the UWB connection can be greatly reduced. This can also improve power consumption since less power is then consumed in searching for beacon transmissions. It also allows the transceivers 12, 22 to adopt power-saving modes in which they do not transmit data for prolonged periods without that hindering the establishment of connections. This could be extended such that, in order to further save power, transceivers 12, 22 are completely powered down except as such times when a communication link between them has been requested via transceivers 14, 24 or is in operation. The information communicated via transceivers 14, 24 could include information indicating which of the two devices should transmit the beacon and which should search for the beacon. Alternatively, this information could be inferred from a non-symmetrical characteristic of the link between transceivers 14, 24; for example, in the case where the link between the transceivers 14, 24 uses a protocol such as Bluetooth, which of the transceivers 14, 24 is the master of the link between themselves.

The second transceivers 14, 24 operate on a frequency band and/or a protocol that differs from those on which the first transceivers 12, 22 operate. The second transceivers preferably operate using a protocol on which a pre-set channel is used in order to exchange data needed to readily establish a connection, since in this way the transceivers 14, 24 can reliably establish a connection more quickly than an unassisted pair of the UWB transmitters. This pre-set channel could be a broadcast channel. Alternatively it could be a dedicated channel for connection establishment, for example with a base station. The pre-set channel could be a pre-set frequency channel or a channel of another type, for example a spread-spectrum channel. In a preferred embodiment the second transceivers 14, 24 operate using Bluetooth.

The information that is transferred between the transceivers 14, 24 is sufficient to assist the establishment of a communication channel between the transceivers 12, 22. The information could, for example, comprise any one or more of the following:
- an indication of a UWB channel to be used by the devices;
- an indication of a UWB frequency band to be used by the devices;
- an indication of a UWB frequency hopping scheme to be used by the devices;
- an indication of the start time of a frequency hopping sequence;
- a definition of one or both devices' hibernation modes and/or timings;
- an indication of the timing of beacon transmissions by an established device; and
- an indication of the identity of the UWB device, for example its UWB device ID or MAC address.

Each of these parameters can independently be negotiated between the devices or dictated by one of the devices, typically the established device if any. Each device could transmit some or all of this information to the other. Timings could be absolute or relative. Most conveniently timings could be defined with reference to the operational timing of the communication system employed by the transceivers 14, 24, for instance with reference to a Bluetooth clock of that system.

If the information that has been transferred inherently identifies the channel to be used by transceivers 12 and 22 and allows them to start communicating then they can do so when the information has been passed to them by the transceivers 14, 24. Alternatively, the information may just allow the devices to shorten the channel search: for example if the information consists of an indication of beacon timings. In that case at least one of the transceivers 12, 22 performs a search for transmissions from the other taking the information into account so as to shorten the search. To do this it determines a search procedure that excludes possible channels or timings of beacon signals that are incompatible with the passed information, and adopts that search procedure until a suitable beacon signal is detected or until some other timeout.

Thus the information transferred between transceivers 14 and 24 allows the time it takes to form a connection between the transceivers 12 and 22 to be reduced, and may also improve the reliability and reduce the power consumption cost of establishing the connection.

A channel may already be established between the transceivers 14 and 24 when the need arises to establish the channel between transceivers 12 and 22. Alternatively a channel might not already be established between the transceivers 14 and 24 when the need arises to establish the channel between transceivers 12 and 22. In the latter case, a channel may be established between the transceivers 14 and 24 in response to the need to establish the channel between transceivers 12 and 22. The channel between transceivers 14 and 24 may then be dropped once the information needed to assist the acquisition of the channel between transceivers 12 and 22 has been passed. Provided the transceivers 14 and 24 operate according to a protocol that permits more efficient channel acquisition than the one according to which transceivers 12 and 22 operate (as will be discussed in more detail below), this would allow the establishment of the channel between transceivers 12 and 22 to be made more efficient irrespective of the pre-existing conditions. Alternatively that information could be passed only if there is a pre-existing channel between transceivers 14 and 24. A third alternative is that if there is no pre-existing channel between transceivers 14 and 24 the devices initially attempt to acquire a channel between transceivers 12 and 22 by normal means, i.e. without use by both devices of the information that would otherwise be shared between them. Subsequently, if that initial attempt had not succeeded after a pre-set period of time a channel would be established between transceivers 14 and 24 and the information would be transferred and used as described above. This may be useful if the devices had previously communicated on one or more channels, had stored information defining one or more of those channels and may have remained in operation on one of those channels.

In a practical implementation the first and second transceivers of each device could be integrated into a single hardware unit, for instance on a common integrated circuit.

The devices may take any suitable form. Without limitation each device could, for example, independently be a notebook computer, a PDA (personal digital assistant), a mobile phone, a headset or a wireless LAN (local area network) access point. One or both devices could be a single integrated circuit. Such an integrated circuit could be incorporated into a device of the types listed above in order to provide those devices with the functionality described herein.

The protocol used by transceivers 12 and 22 preferably has an attribute that makes it preferable to that used between transceivers 14 and 24 for ongoing use. That attribute could, for instance, be a higher data rate, a lower power consumption, a better tolerance of interference or a reduced generation of interference. That makes it advantageous to continue communication using transceivers 12 and 22.

The protocol used between transceivers 12 and 22 is preferably one according to which a device searches for a beacon transmission from another device in order to establish a communication channel with that device. Preferably it is a protocol that includes no pre-set channel for use in exchanging information for use in channel establishment, such as a broadcast channel. Preferably it is a protocol that does not provide for devices to act as base stations for the facilitation of the exchange of channel information between other devices for establishing a communication between those other devices.

The protocol in use between transceivers 14 and 24 preferably provides a relatively efficient means of identifying other nearby devices, and of establishing a communication link with an identified device. For example, in the Bluetooth air interface system a procedure known as inquiry is defined for use in identifying other devices that are available for communication. In the inquiry procedure a device transmits ID packets containing its identity on an inquiry hopping sequence. The inquiry hopping sequence utilises a subset of the full number of available Bluetooth frequency channels in order to reduce the search space that a listening device must review in order to locate other devices. The transmitting device sends two such ID packets at different frequencies in even-numbered time slots and waits for responses in the odd-numbered slots. 32 hop frequencies are permitted for the sending of such ID packets, and these are split into two 16-hop trains. Each train lasts 10 msec (16 slots). A scanning device listens at one of 32 inquiry frequencies for 11.25 msec at least once every 2.56 sec. In this way, Bluetooth provides for a relatively efficient mechanism for identifying neighbouring devices. This procedure therefore allows devices to be identified without the need for the listening device to listen on all the frequency channels that can be used when a link is in operation. Once a device has been identified the Bluetooth paging procedure is used to establish a connection to an already-known unit. A 32-hop page sequence is derived as a function of the address/identity of the device that is to be paged. Connection messages are then sent according to that paging sequence to initiate the connection. The paged device scans continuously for connection messages on the page sequence corresponding to its address. In that way the establishment of a connection between Bluetooth devices can be accomplished relatively efficiently. A similar result could be achieved in a system that used a dedicated channel for paging.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for establishing a radio communication channel by means of a first air interface between a first device and a second device, the method comprising:
    transmitting from one of the first and second devices to the other of the first and second devices by means of a second air interface information that at least partially identifies the channel; and establishing the channel by means of that information;
wherein the first air interface is an ultra-wideband (UWB) air interface, and the information comprises an indication of a UWB frequency hopping scheme to be used by the first and second devices, and an indication of the start time of a frequency hopping sequence.

2. A method as claimed in claim 1, wherein the first and second air interfaces differ in the communication protocols according to which they operate.

3. A method as claimed in claim 2, wherein the second air interface is a Bluetooth air interface.

4. A method as claimed in claim 1, wherein the first and second air interfaces occupy different frequency bands.

5. A method as claimed in claim 1, wherein the said information wholly identifies the channel and the said establishing step comprises both devices adopting that channel for communication over the first air interface.

6. A method for establishing a radio communication channel by means of a first air interface between a first device and a second device, the method comprising:
transmitting from one of the first and second devices to the other of the first and second devices by means of a second air interface information that partially identifies the channel; and
establishing the channel by means of that information, the establishing step comprising:
the first device transmitting one or more beacon transmission signals on the channel in accordance with the said information;
the second device determining on the basis of the said information a procedure for attempting to receive a beacon transmission from the first device;
the second device attempting to receive a beacon transmission from the first device in accordance with the determined procedure; and
on the second device receiving a beacon transmission from the first device on a channel, the first device adopting that channel for communication over the first air interface;
wherein the first air interface is an ultra-wideband air interface, and the information comprises an indication of a UWB frequency hopping scheme to be used by the first and second devices, and an indication of the start time of a frequency hopping sequence.

7. A method as claimed in claim 6, wherein the said procedure is such as to inhibit attempts by the second device at reception of beacon transmissions that are not in accordance with the said information.

8. A method as claimed in claim 6, wherein the said information comprises information that indicates the timing of beacon transmissions.

9. A method as claimed in claim 8, wherein the said information is in the form of the timing of beacon transmissions relative to that of the communication slots of the second air interface and the method comprises transmitting the beacon transmissions at times that are offset in a predetermined manner from slot timings of slots of the second air interface.

10. A method as claimed in claim 6, wherein the said information comprises information that indicates the frequency, spreading code or frequency hopping sequence of beacon transmissions.

11. A method as claimed in claim 6, wherein the first air interface operates according to a system according to which a device searches a range of channels in order to identify a channel on which another devices is transmitting a beacon signal for establishing a communication channel with that device.

12. A method as claimed in claim 6, wherein the second air interface operates according to a system according to which devices may communicate on a plurality of channels but wherein devices are restricted to transmitting signals on a subset of those channels for establishing a communication channel with another device with which they are not in communication.

13. A method as claimed in claim 6, wherein the first air interface is supported by a first set of apparatus and the second air interface is supported by a second set of apparatus, and the method comprises maintaining at least part of the first set of apparatus in a low power state until a request to activate it is received via the second air interface.

14. A radio communication device arranged to establish a radio communication channel by means of a first air interface between the device and another device, wherein said radio communication device:
receives from said another device by means of a second air interface information that at least partially identifies the channel; and
establishes the channel by means of said received information;
wherein the first air interface is an ultra-wideband (UWB) air interface, and the information comprises an indication of a UWB frequency hopping scheme to be used by the first and second devices, and an indication of the start time of a frequency hopping sequence.

15. A device as claimed in claim 14, wherein the said information wholly identifies the channel and the said establishing step comprises the device adopting that channel for communication over the first air interface.

16. A radio communication device arranged to, for establishing a radio communication channel by means of a first air interface between the device and another device, wherein said radio communication device:
receives from said another device by means of a second air interface information that at least partially identifies the channel; and
establishes the channel by means of said received information, the establishing step comprising:
determining on the basis of the said information a procedure for attempting to receive a beacon transmission from the another device;
attempting to receive a beacon transmission from the another device in accordance with the determined procedure; and
on the device receiving a beacon transmission from the another device on a channel, the device adopting that channel for communication over the first air interface;
wherein the first air interface is an ultra-wideband air interface, and the information comprises an indication of a UWB frequency hopping scheme to be used by the first and second devices, and an indication of the start time of a frequency hopping sequence.

17. A device as claimed in claim 16, wherein the said procedure is such as to inhibit attempts by the device at reception of beacon transmissions that are not in accordance with the said information.

18. A device as claimed in claim 14, wherein the first air interface operates according to a system according to which a device searches a range of channels in order to identify a channel on which another devices is transmitting a beacon signal for establishing a communication channel with that device.

19. A device as claimed in claim 14, wherein the second air interface operates according to a system according to which devices may communicate on a plurality of channels but wherein devices are restricted to transmitting signals on a subset of those channels for establishing a communication channel with another devices with which they are not in communication.

20. A device as claimed in claim 14, wherein the first air interface is supported by a first set of apparatus and the second air interface is supported by a second set of apparatus, and the device is configured to maintain at least part of the first set of apparatus in a low power state until a request to activate it is received via the second air interface.

21. A method as claimed in claim 6, wherein the first and second air interfaces differ in the communication protocols according to which they operate.

22. A method as claimed in claim 21, wherein the second air interface is a Bluetooth air interface.

23. A method as claimed in claim 6, wherein the first and second air interfaces occupy different frequency bands.

24. A radio communication device as claimed in claim 16, wherein the first air interface operates according to a system in which a radio communication device searches a range of channels in order to identify a channel on which another device is transmitting a beacon signal for establishing a communication channel with the radio communication device.

25. A radio communication device as claimed in claim 16, wherein the second air interface operates according to a system in which devices may communicate on a plurality of channels but wherein devices are restricted to transmitting signals on a subset of those channels for establishing a communication channel with another device with which they are not in communication.

26. A radio communication device as claimed in claim 16, wherein the first air interface is supported by a first set of apparatus and the second air interface is supported by a second set of apparatus, and the radio communication device is configured to maintain at least part of the first set of apparatus in a low power state until a request to activate said first set of apparatus is received via the second air interface.

* * * * *